US008179876B2

(12) United States Patent
Agrawal et al.

(10) Patent No.: US 8,179,876 B2
(45) Date of Patent: May 15, 2012

(54) MULTIPLE MODULATION TECHNIQUE FOR USE IN A COMMUNICATION SYSTEM

(75) Inventors: Avneesh Agrawal, San Diego, CA (US); Aamod Khandekar, San Diego, CA (US); Arak Sutivong, Bangkok (TH); Alexei Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 497 days.

(21) Appl. No.: 11/315,743

(22) Filed: Dec. 21, 2005

(65) Prior Publication Data

US 2006/0133455 A1 Jun. 22, 2006

Related U.S. Application Data

(60) Provisional application No. 60/638,932, filed on Dec. 22, 2004.

(51) Int. Cl.
*H04J 1/00* (2006.01)
(52) U.S. Cl. ........................................ 370/343; 455/450
(58) Field of Classification Search .................. 370/320, 370/319
See application file for complete search history.

(56) References Cited

U.S. PATENT DOCUMENTS

| 6,785,298 | B1 | 8/2004 | Hwang | |
|---|---|---|---|---|
| 2002/0187785 | A1* | 12/2002 | Iizuka | 455/442 |
| 2004/0141481 | A1 | 7/2004 | Lee et al. | |
| 2004/0264507 | A1* | 12/2004 | Cho et al. | 370/480 |
| 2005/0063345 | A1* | 3/2005 | Wu et al. | 370/335 |
| 2005/0249177 | A1* | 11/2005 | Huo et al. | 370/342 |

FOREIGN PATENT DOCUMENTS

| JP | 200432380 | | 1/2004 |
|---|---|---|---|
| JP | 2004096445 | A | 3/2004 |
| JP | 2004158901 | A | 6/2004 |
| JP | 2004159303 | | 6/2004 |
| JP | 2004200856 | | 7/2004 |

OTHER PUBLICATIONS

International Search Report—PCT/US05/047645—International Search Authority, European Patent Office,May 18, 2006.
Written Opinion—PCT/US05/047645, International Search Authority—European Patent Office, May 18, 2006.
International Preliminary Report on Patentability—PCT/US05/047645—The International Bureau of WIPO, Geneva, Switzerland, Jun. 26, 2007.
European Search Report—EP10011085, Search Authority—Munich Patent Office, Nov. 12, 2010.
European Search Report—EP10011086, Search Authority—Munich Patent Office, Nov. 12, 2010.
Taiwan Search Report—TW094146431—TIPO—Sep. 27, 2011.

* cited by examiner

*Primary Examiner* — Marcos Batista
(74) *Attorney, Agent, or Firm* — Peng Zhu

(57) ABSTRACT

A method for receiving an indication to apply a first modulation scheme to modulate one or more segments of a first portion includes determining a first segment set, having at least one segment of the first portion for applying the first modulation scheme. The method further includes modulating the first segment set of the first portion using the first modulation scheme. In addition, the method includes modulating one or more segments of the second portion using a second scheme, different from first modulation scheme.

72 Claims, 5 Drawing Sheets

MULTIPLE MODULATION TECHNIQUE FOR USE IN A COMMUNICATION SYSTEM

CLAIM OF PRIORITY UNDER 35 U.S.C. §119

The present Application for patent claims priority to Provisional Application No. 60/638,932 entitled "A MULTIPLE MODULATION TECHNIQUES FOR USE IN A COMMUNICATION SYSTEM" filed Dec. 22, 2004, and assigned to the assignee hereof and hereby expressly incorporated by reference herein.

BACKGROUND

I. Field

The present invention relates generally to data communication, and more specifically to techniques for using two or more modulation schemes in a single communication system.

II. Background

Wireless communication systems are widely deployed to provide various types of communication such as voice, data, and so on. These systems may be multiple-access systems, having unique modulation schemes, capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, universal mobile telecommunication system (UMTS) using wideband code divisional multiple access (WCDMA), and orthogonal frequency division multiple access (OFDMA) systems. Typically, a wireless communication system comprises several base stations, wherein each base station communicates with a mobile station using a forward link and a preset modulation scheme, and each mobile station communicates with a base station using a reverse link and a preset modulation scheme. A wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations.

Thus, there is a need in the art for techniques that use the benefits of CDMA communication system with OFDMA communication system.

SUMMARY

Accordingly, a method is provided for receiving an indication to apply a first modulation scheme to modulate one or more segments of a first portion, determining a first segment set, the first segment set having at least one segment of the first portion for applying said first modulation scheme, modulating said first segment set of the first portion using said first modulation scheme, and modulating one or more segments of a second portion using a second scheme, the second scheme being different from the first modulation scheme.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
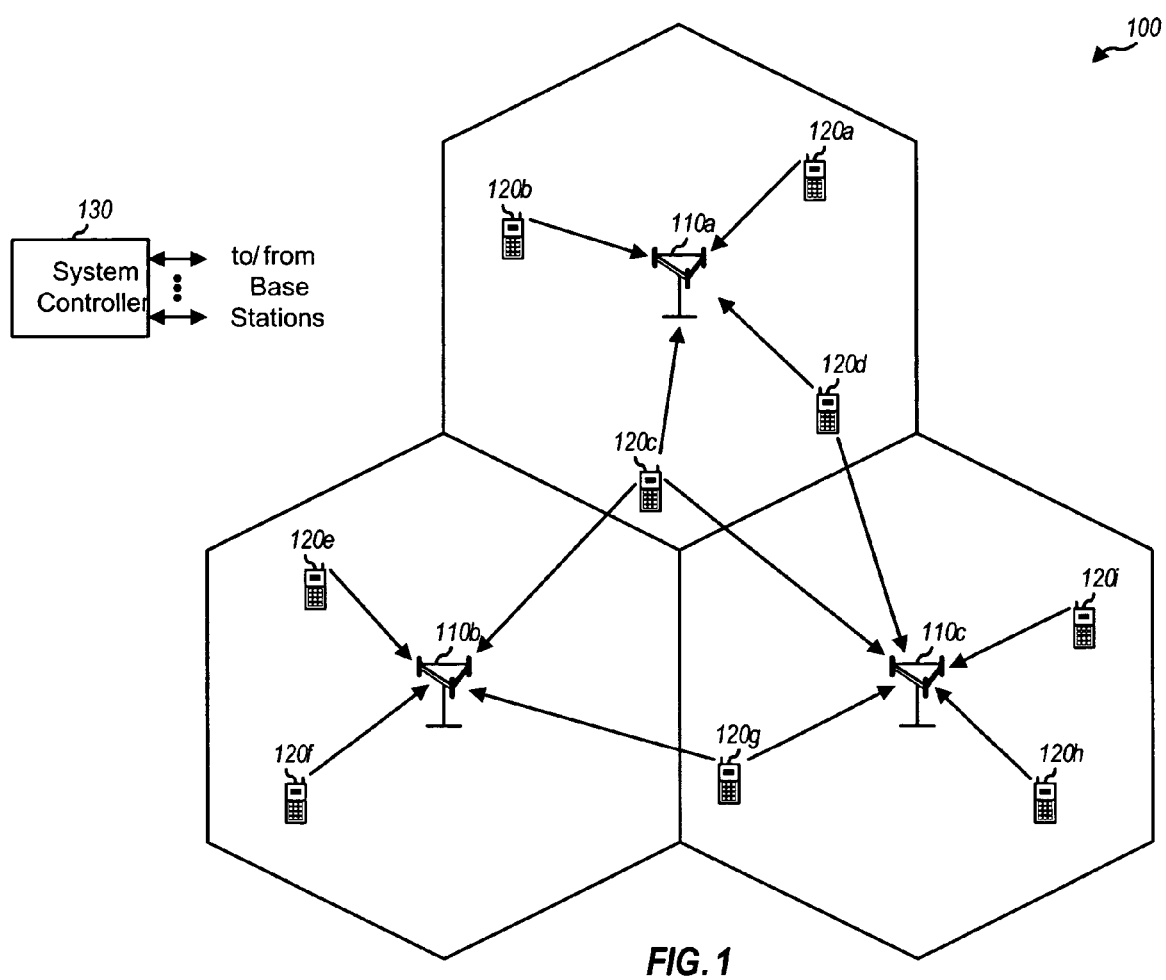
FIG. 1 illustrates a wireless multiple-access communication system.

FIG. 1 shows a diagram of a wireless multiple-access communication system 100 that employs multiple modulation techniques. System 100 includes a number of access points (APs), for example, access points 110a, 110b and 110c that communicate with a number of access terminal (ATs) 120a, 120b, 120c, 120d, 120e, 120f, 120g, 120h and 120i (120a-120i). For clarity, only three access points 110a, 110b and 110c and only nine access terminals 120a-120i are shown in FIG. 1. As an example, AT 120x is used when describing one of the access terminals, 120a-120i. Also, AP 110x, is used when describing one of the access points, 110a-110c.

An access point (AP), for example access point 110x, is an electronic device configured to communicate with one or more user ATs and may also be referred to as an access node, access network, a base station, base terminal, fixed terminal, a fixed station, base station controller, a controller, transmitter or some other terminology. The access point, base terminal, and base station are interchangeably used in the description below. The access point may be a general purpose computer, a standard laptop, a fixed terminal, an electronic device configured to transmit, receive and process data according to air interface methods defined by an OFDMA, CDMA, GSM, WCDMA, etc. system. The access point may be an electronic module comprising one or more computer chips controlled by a controller or a processor for transmitting, receiving or processing data according to air interface methods defined by an OFDMA, CDMA, GSM, WCDMA, etc. system.

An access terminal (AT, herein referred to as AT 120x), is an electronic device configured to communicate with the access point via a communication link. The AT 120x may also be referred to as a mobile terminal, a user terminal, a remote station, a mobile station, a wireless communication device, recipient terminal, or some other terminology. The access terminal, mobile terminal, user terminal, terminal are interchangeably used in the description below. Each access terminal 120x may communicate with one or multiple access points on the downlink and/or uplink at any given moment. The downlink (i.e., forward link) refers to transmission from the access point to the access terminal 120x, and the uplink (i.e., reverse link) refers to transmission from the access terminal 120x to the access point. The access terminal 120x may be any standard laptop, personal electronic organizer or assistant, a mobile phone, cellular phone, an electronic device configured to transmit, receive or process data according to air interface methods defined by an OFDMA, CDMA, GSM, WCDMA, etc. system. The AT 120x may be an electronic module comprising one or more computer chips controlled by a controller or a processor for transmitting, receiving or processing data according to air interface methods defined by an OFDMA, CDMA, GSM, WCDMA, etc. system.

A system controller 130 couples to the access points and may further couple to other systems/networks (e.g., a packet data network). System controller 130 provides coordination and control for the access points coupled to it. Via the access points, system controller 130 further controls the routing of data among the ATs, and between the ATs and other devices coupled to the other systems/networks.

In the OFDMA system, multiple orthogonal "traffic" channel may be defined whereby (1) each subcarrier (also referred to as a segment) is used for only one traffic channel in any given time interval and (2) each traffic channel may be assigned zero, one, or multiple subcarriers in each time interval.

A CDMA system uses code division multiplexing that is generally non-orthogonal, wherein the transmissions for different ATs are orthogonalized by using different orthogonal (e.g., Walsh) codes for the forward link rather than using separate resources. The ATs use different pseudo-random number (PN) sequences for the reverse link in CDMA and are not completely orthogonal to one another. All of a signal's power in a CDMA wireless link is spread simultaneously over a wide frequency band, transmitted over the same frequency band, and then collected onto their original signals at the receiving end. The spread signal would then appear as a noise like signal scattered over the same wide transmission band with a much lower power per bandwidth.

A TDMA system uses time division multiplexing, and transmissions for different ATs are orthogonalized by transmitting in different time intervals. An FDMA system uses frequency division multiplexing, and the transmissions for different ATs are orthogonalized by transmitting in different frequency subbands. An OFDMA system utilizes orthogonal frequency division multiplexing (OFDM), which effectively partitions the overall system bandwidth into a number of orthogonal frequency subbands. These subbands are also commonly referred to as tones, sub-carriers, bins, and frequency channels. An OFDMA system may use various orthogonal multiplexing schemes and may employ any combination of time, frequency, and/or code division multiplexing.

The techniques described herein may be used for various types of "physical" channels. The physical channels may also be referred to as code channels, transport channels, or using some other terminology. The physical channels typically include "data" channels used to send traffic/packet data and "control" channels used to send overhead/control data. A system may employ different control channels to send different types of control information. For example, a system may use (1) a CQI channel to send channel quality indicators (CQI) indicative of the quality of a wireless channel, (2) an ACK channel to send acknowledgments (ACK) for a hybrid automatic retransmission (H-ARQ) scheme, (3) a REQ channel to send requests for data transmission, and so on.

For clarity, techniques are specifically described below for control channel used for the reverse link. Transmissions from different ATs on this control channel may be non-orthogonally multiplexed in frequency, time, and/or code space, using CDMA concepts. With non-orthogonality, Walsh Coding or PN codes may be used to identify each AT 120x on the control channel. In an embodiment, one or more of the control channels may be modulated using non-orthogonal modulation concepts while remaining channels may be modulated using orthogonal modulation techniques.

Figure 2:
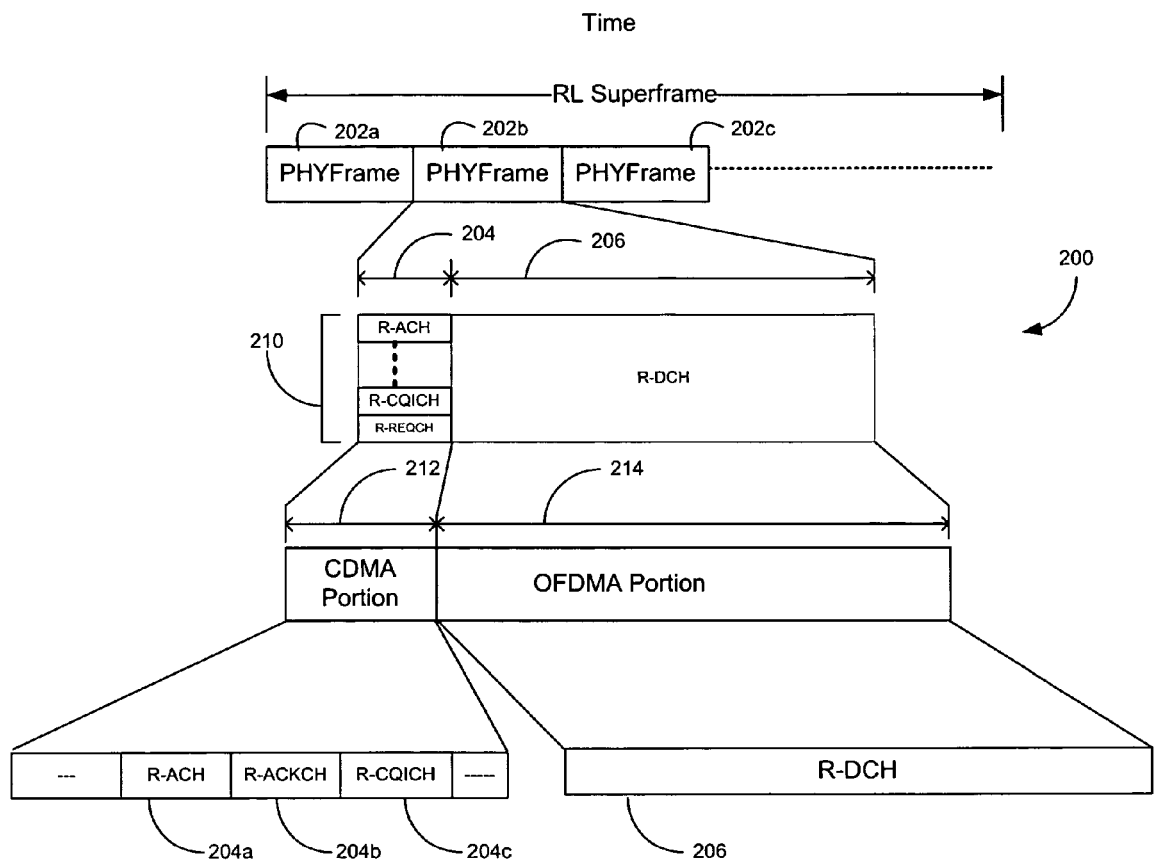
FIG. 2 illustrates a structure of a superframe.

FIG. 2 shows a structure of a superframe 200, according to an aspect. The superframe 200 includes a plurality of physical frames, 202*a*, 202*b*, and 202*c* and so on. Each physical frame, for example 202*b*, comprises a control channel portion 204, and a data segment portion 206. Each portion comprises one or more channels, and each channel (also referred to as a segment set) may be made up of one or more segments (also known as subcarrier). Each segment has a frequency bandwidth and is processed over one or more OFDMA symbols. The control channel portion 204 carries one or more control channels on the reverse link, for example an Access Channel (R-ACH) 204*a*, an Acknowledgement Channel (R-ACKCH) 204*b*, and a Channel Quality Indicator Channel (R-CQICH) 204*c*. Additionally, a control channel may comprise a Request Channel (R-REQCH), not shown, which is interlaced with R-CQICH 204*c*, i.e., they are generally not transmitted in the same frame.

The data segment portion 206 comprises a Data Channel (R-DCH) used for data transmission. The data segment comprises a long data portion 214 and a short data portion 212. The short data portion is processed during the same duration as the control channel portion 204 and is made up of segments that are not used for communicating control information. The long data portion is processed after the control channel is processed and generally represents the OFDMA portion 214. The assignments of the channels described above are received via an assignment channel from the AP 120x.

In an aspect of an AP 110x, depending on the number of users in a system, all or part of the control channel portion 212 may be modulated using various different schemes. For example the code divisional multiple access (CDMA) technique may be used with OFDMA techniques. Generally, the transmissions from different ATs are not orthogonal to each other on a portion of the frame and are orthogonal on another portion. For each of the channels mentioned above, a time-domain sequence of length L (for example, L=512) times $N_{CTRL}$ (which represents a duration of a segment e.g. number of OFDM symbols) is generated. Each sequence is targeted at a specific sector, referred to as the Target Sector for this sequence, which is determined by the appropriate Medium Access Control (MAC) protocol (MAC for R-ACH sequences and MAC for the other control channels). Each sequence is then subject to a MACID (one or more bits representing an ID of AT) scrambling operation, followed by a sector scrambling operation. The sector-scrambled sequences are then summed up and are converted to the frequency domain using a Discrete Fourier Transform (DFT) operation. The frequency domain sequence is then mapped to the subcarriers in the control subsegment assigned to the AT 120x.

In the case that the AT has an active set size larger than 1, different channels transmitted on the control segment may have different values of target sector. Let $N_{CTRL,MAX}$ be the maximum value of $N_{CTRL}$ among all the sectors in $AS_{SYNCH}$. $AS_{SYNCH}$ is a subset of sectors wherein, all sectors that are synchronous with the sector in this subset. If the AT is not scheduled to transmit a R-DCH packet in the Long data portion of the same frame to a sector in $AS_{SYNCH}$, then $N_{CTRL}$ should be set equal to $N_{CTRL,MAX}$. If the AT is scheduled to transmit an R-DCH packet in the Long data portion of the same frame, then $N_{CTRL}$ may be equal to the value of $N_{CTRL}$ corresponding to the Target Sector for the R-DCH packet (which is the sector from which the assignment was received).

The same control subsegment is assigned to the AT for all sectors in $AS_{SYNCH}$. The hopping sequence for the Control Segment is used while mapping the frequency-domain sequence to subcarriers. The Control Segment hopping sequence maps the control subsegment to the same set of subcarriers for all the sectors in $AS_{SYNCH}$, hence different values for Target Sector for different physical layer channels cause no ambiguity as to which subcarriers are modulated.

Walsh sequences are used in the generation of the time-domain sequences for several of the physical layer channels carried in the control segment. A Walsh sequence $W_i^N$, where N is a power of 2 and i is a non-negative integer less than N, is a length-N sequence with all the entries being +1 or -1. The Walsh sequence $W_0^1$ has a single entry +1. The length two Walsh sequences $W_0^2$ and $W_1^2$ are given by [+1 +1] and [+1 -1] respectively. More generally, the length-N Walsh sequence $W_i^N$ is defined recursively as $[W_{i \bmod N/2}^{N/2} \ W_{i \bmod N/2}^{N/2}]$ if i<N/2, and as $[W_{i \bmod N/2}^{N/2} \ -W_{i \bmod n/2}^{N/2}]$ otherwise. Here, the notation [XY] denotes the concatenation of two sequence X and Y, while the notation -X denotes multiplication of each entry in X by -1.

In the single input single output (SISO) mode, the reverse acknowledgement channel (R-ACKCH) is a single-bit ON-OFF transmission over one control subsegment, i.e., no energy is transmitted on this channel if the value of this bit is zero. The value of this bit and the power P at which it is transmitted (if the bit value is 1) are determined by the Shared Signal (SS) MAC protocol.

In the case that the R-ACKCH bit is 1, the time-domain R-ACKCH sequence may be a length $L*N_{CTRL,ACK}$ (duration of R-ACKCH in units of OFDM symbols) sequence, with each entry being the complex number (1,0). This is equivalent to repeating the 512-length Walsh sequence W.sub.0.sup.512 by a factor of $N_{CTRL,ACK}$. This sequence may be multiplied by $\sqrt{P*N_{FFT}/512}$ to ensure that the sequence is transmitted with the correct power, where P is the power assigned to this sequence by the SS MAC protocol and $N_{FFT}$ is the size of fast fourier transform (FFT).

In an aspect, when the AT is in a soft handoff mode, R-CQICH may be utilized to improve soft handoff gain. By modulating R-CQICH using CDMA principals, only one channel, shared by others, may be utilized to perform a soft handoff. As discussed above, Walsh coding may be used to manage the interference.

Figure 3A:
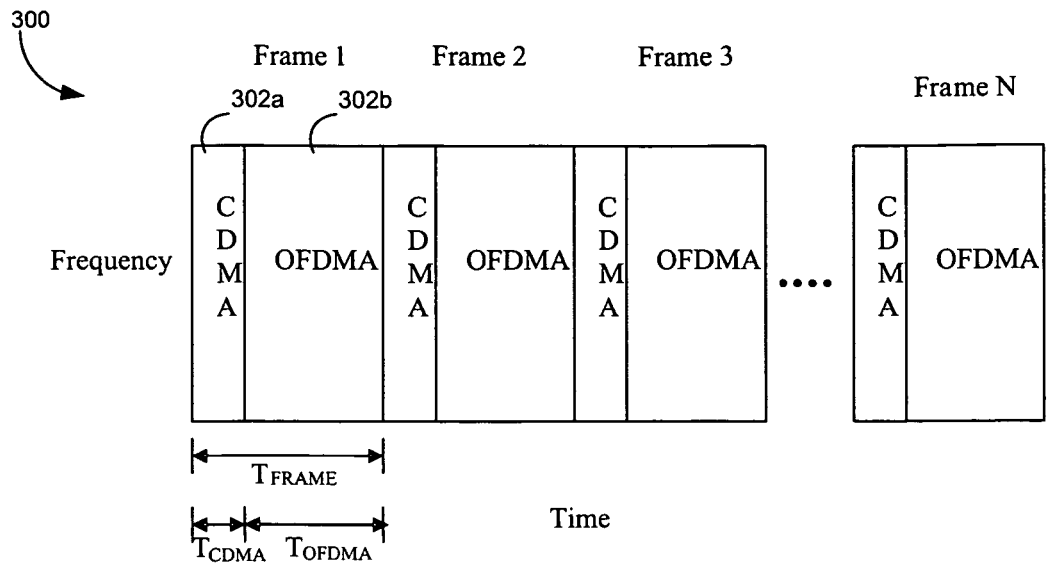
FIGS. 3A and 3B each show a reverse link structure.

FIG. 3A shows a reverse link structure 300 according to an embodiment. For example, each frame has a duration $T_{FRAME}=T_{CDMA}+T_{OFDMA}$. The $T_{CDMA}$ duration can vary from frame to frame and is controlled by the base station. The reverse link control channels (CQI, REQUEST and ACK/NACK) and access probes are primarily transmitted in the CDMA portion 302a (e.g. transmitted using CDMA techniques or other non-orthogonal techniques), while actual data is primarily transmitted in the OFDMA (e.g. any orthogonal techniques) portion 302b. This allows some control channel transmission in the OFDMA portion 302b and some data transmission in the CDMA portion 302a.

Figure 3B:
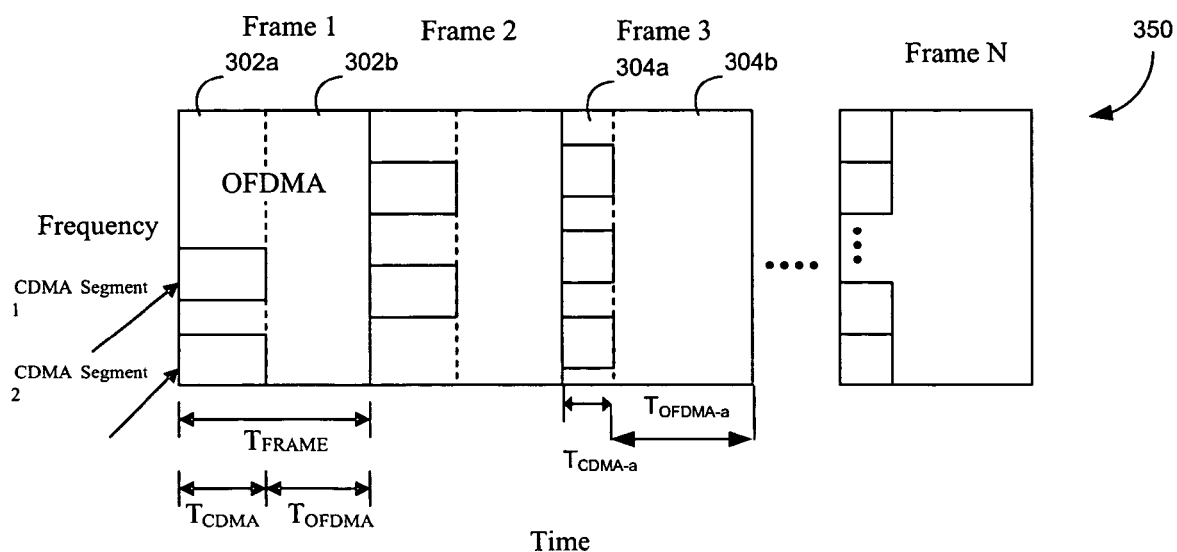

FIG. 3B shows a structure of reverse link 350, according to another aspect. The $T_{CDMA}$ duration can be adjusted to control the system overhead (i.e., overhead=$T_{CDMA}/T_{FRAME}$), it is often not practical to use a very small $T_{CDMA}$, as control channel link budget can be severely impacted. A more general allocation in which the CDMA portion 302a does not occupy the whole bandwidth in the allotted $T_{CDMA}$ can be used, i.e. only the needed channels transmitted using CDMA techniques. For example, when system traffic is reducing, as shown in Frame 3, the CDMA portion 304a is reduced to $T_{CDMA-a}$.

Generally, the bandwidth assigned to each CDMA sub-segment does not need to be the same. However, same sub-segment size (in terms of bandwidth) allows for simpler overhead management, hopping, and utilization of remaining bandwidth for data transmission in OFDMA. Also, an efficient handoff signaling schemes can be designed when all sectors can simultaneously monitored the same control transmission from each user. In an aspect, if a AT needs to be put on the same CDMA sub-segment when in handoff, it can be accomplished by making sure that all sectors allocate their CDMA sub-segment in the same manner (e.g., always grows the allocation from low frequency to high frequency, etc.) and utilize the same hopping pattern. Then, a AT can always be put in a segment which all sectors in the active set may simultaneously be monitored. Different $T_{CDMA}$ duration across sectors (even during handoff) can be fairly effectively handled. For instance, each user only transmits CQI over min $\{T_{CDMA,1}, \ldots T_{CDMA,K}\}$, where $T_{CDMA,i}$ is a CDMA sub-segment duration of sector i in the active set (whose size is K). For REQUEST and ACK/NACK transmission, the controller 130 may want to transmit over the CDMA segment duration of the sector for which the information is intended. As for the access probe transmission, a controller 130 can randomly select the segment among the available CDMA segments.

Figure 4A:
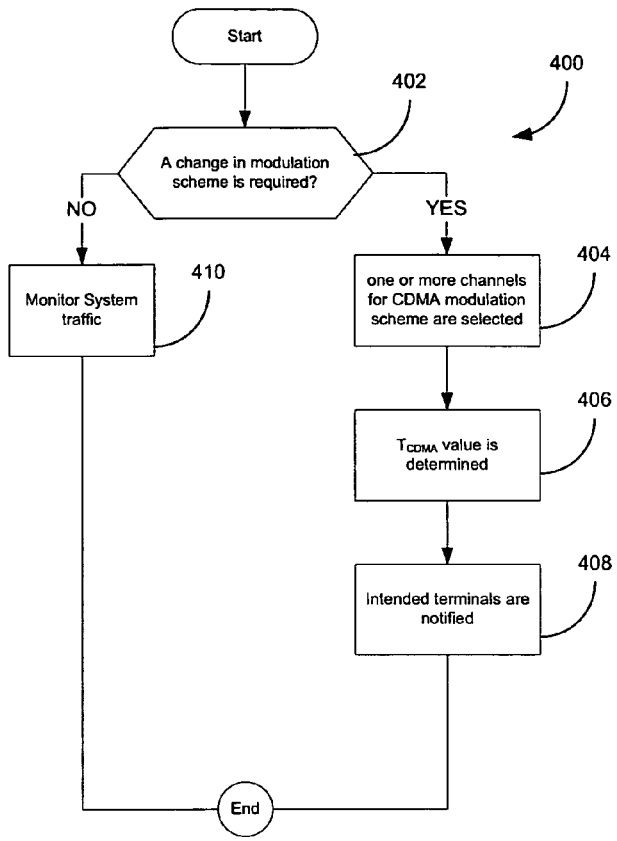
FIG. 4A illustrates a flow diagram of a process used by a mobile station.

FIG. 4A illustrates a flow diagram of process 400, according to an aspect. Generally, the base stations implement process 400 for requesting ATs to start modulating a portion of a frame using a different scheme (for example any non-orthogonal multiple access scheme e.g. CDMA). The steps of the process 400 are executed by the AP 110x. The AP 110x is configured to utilize one or more components discussed in FIG. 6, for example, the controller 620, scheduler 630, TX Data Processor 614, RX Data Processor 634, etc. to execute the steps of the process 400. At step 402, AP 110x determines if a change in modulation scheme is required. For example, AP 110x may have a predetermined threshold for system traffic set by the operator. If system traffic surpasses the threshold, the AP determines that it requires a change in modulation scheme. If no, then at step 410, the system traffic is monitored. Otherwise, at step 404, one or more channels are selected for employing CDMA modulation scheme (or an orthogonal multiple access scheme).

Generally, the channel may be made up of one or more segments ($T_{CDMA}$×Frequency). The channel is also defined as a portion of the frame. When the request to modulate using multiple modulation schemes is received, the AP 110x considers the frame for the reverse link to have a first portion and a second portion. Generally, the first portion is modulated using a modulation scheme that is different from that of a second portion. At step 406, AP 110x determines the $T_{CDMA}$ value or uses a preset value. The $T_{CDMA}$ value varies based on requirements of the system design. As stated above, $T_{CDMA}$ value may vary from frame to frame, or may be constant. The bandwidth of frequency may be predetermined or may be determined by AP 110x based on the type of task to be executed. This request is generally requested by the system controller 130 (e.g. to improve channel quality, for soft handoff, etc.). For example, the system controller 130 may request that an AP 110x align a first segment set, having one or more segments, to use a non-orthogonal scheme in order to allow multiple users to communicate using the first segment set. The first segment set may be one or more segments or subcarrier that are generally used for soft handoff, for communicating channel quality, or power measurements or for communicating pilot sequences between ATs and AP. At step 408, send a request to all the intended ATs to begin modulating, the selected segment set in step 404, using the scheme provided in the request for given duration.

During the operation according to an embodiment, the system controller 130 is monitoring the system traffic conditions. Various factors are used by the system controller 130 to determine if the system performance needs adjusting. For example, the number of users within a geographical area or number of users serviced by an AP 110x have increased or decreased. Generally, if there are more users in a sector, then control channel traffic increases. Also, system performance needs adjusting if the AP 110x requires a reduction in peak-to-average ratio (PAR), because PAR tends to increase as the number of carriers used in OFDMA increases. By separating the transmissions of the control and data, the number of carriers used in OFDMA can be further reduced. In addition, PAR can be more effectively mitigated when only data transmission is present in the OFDMA portion (note: typically, data and control carriers are allocated and hopped independently, rendering most PAR mitigation techniques ineffective). The AP 110x may also request the ATs to use the CDMA scheme on a portion of the frame for improving soft handoff. Using well-established CDMA soft handoff techniques the control channel performance improves due to the soft handoff gain, since all the control channels (from different users) on the CDMA portion are power controlled to the same received power.

Figure 4B:
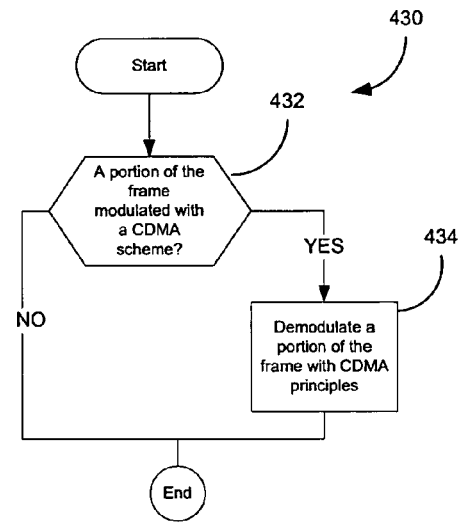
FIG. 4B illustrates a flow diagram of a process used by a base station.

FIG. 4B illustrates a flow diagram of process 430, according to an embodiment. The steps of the process 430 are executed by the AP 110x. The AP 110x is configured to utilize one or more components discussed with reference to FIG. 6, for example, the controller 620, scheduler 630, TX Data Processor 614, RX Data Processor 634, etc. to execute the steps of the process 430. At step 432, the AP 110x determines if a portion of the frame is modulated with a CDMA scheme. The AP 110x may determine if it is in a state that requires demodulating using multiple schemes and checks the database to determine which portion is modulated, for example non-orthogonal multiple access scheme. If so, then at step 434, the base station, previously having the information about the exact portion to demodulate using the CDMA scheme, begins demodulating the portion modulated using the CDMA scheme.

Figure 5:
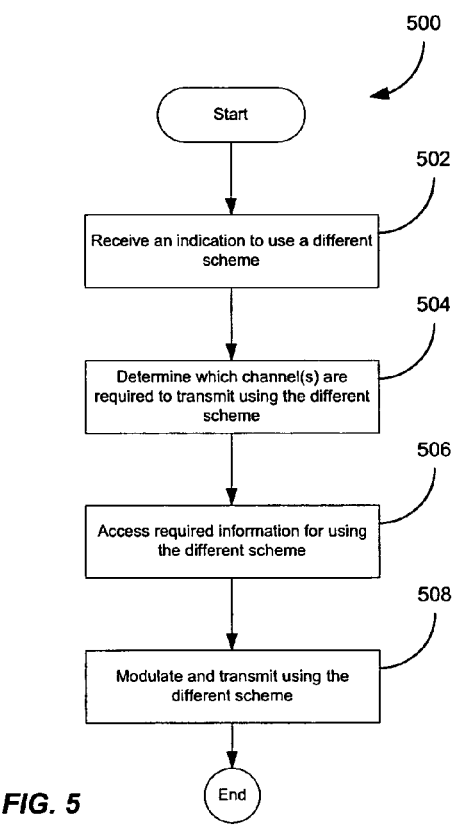
FIG. 5 illustrates a flow diagram of a process used by mobile stations.

FIG. 5 illustrates a flow diagram of a process 500, according to an embodiment. The steps of the process 500 are executed by the AT 120x. The AT 120x is configured to utilize one or more components discussed with reference to FIG. 6, for example, the controller 660, TX Data Processor 674, RX Data Processor 656, etc. to execute the steps of the process 500. At step 502, the AT 120x receives an indication to begin using a different modulation scheme on a portion of allocated resources. At step 504, the request message is evaluated to determine which segments require a different modulation scheme and their duration ($T_{CDMA}$ value). For example, all the segments (also referred to as a first segment set) that generally make up the Channel Quality Indicator channel (e.g. R-CQICH) on a frame are requested to use non-orthogonal modulation techniques for transmitting information. Generally, the AP 110x has determined that for a given period these channels do not require higher throughput, and thus need not be orthogonal. At step 506, the AT 120x accesses required information for using the different scheme. Some information may be pre-stored such as the segment duration or the type of Walsh code to use for applying the CDMA scheme. Once the AT 120x has gathered all the required information, the AT 120x begins modulating the first segment set of a portion of the frame using a first modulation scheme (e.g. CDMA modulation scheme) and modulating one or more of the remaining segments of the frame using a second scheme (e.g. OFDMA modulation scheme). Thereafter, the AT 120x transmits a frame having a CDMA portion, modulated using the CDMA scheme, and an OFDMA portion modulated using an OFDMA scheme.

Figure 6:
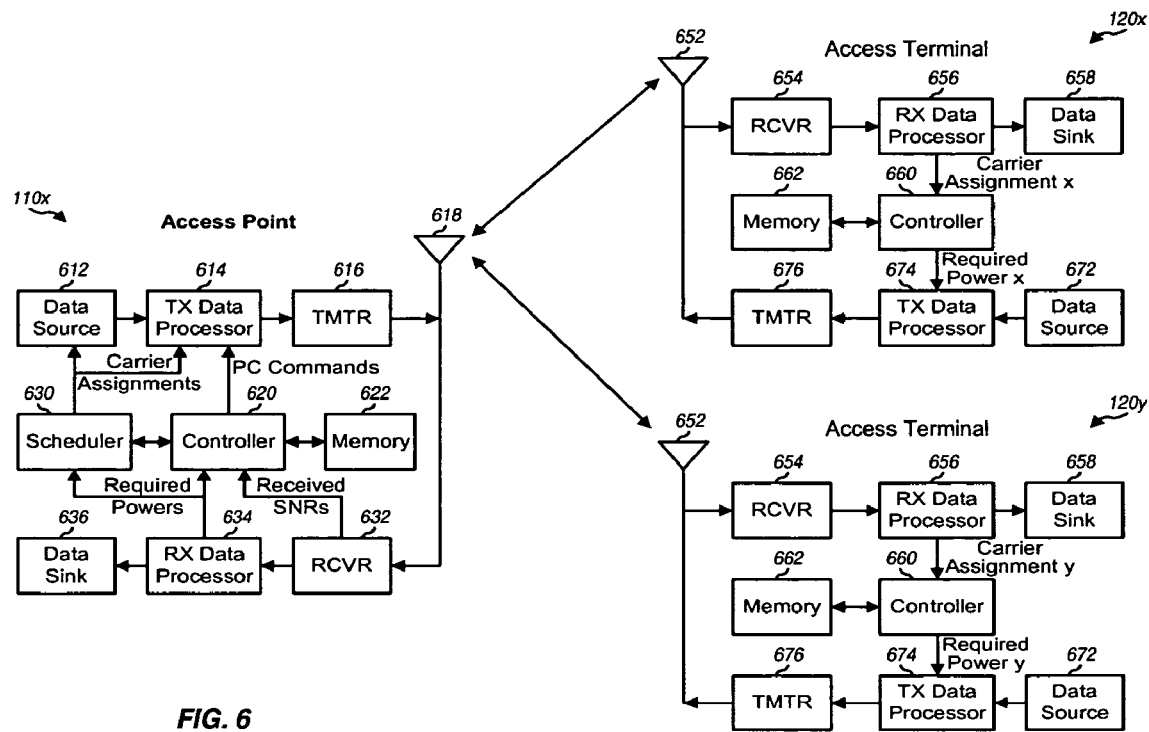
FIG. 6 illustrates a block diagram of a base station and a mobile station.

FIG. 6 shows a block diagram of an aspect of an access point 110x and two access terminals 120x and 120y in wireless communication system 100. At access point 110x, a transmit (TX) data processor 614 receives traffic data (i.e., information bits) from a data source 612 and signaling and other information from a controller 620 and a scheduler 630. For example, controller 620 may provide power control (PC) commands that are used to adjust the transmit power of the active terminals, the controller 620 may provide a message that provides parameters for using multiple modulation schemes, and scheduler 630 may provide assignments of carriers for the terminals. These various types of data may be sent on different transport channels. TX data processor 614 encodes and modulates the received data using one or more modulation schemes (e.g. OFDMA, etc.). A transmitter unit (TMTR) 616 then processes the modulated data to generate a downlink modulated signal that is then transmitted from an antenna 618.

At each of AT 120x and 120y, the transmitted and modulated signal is received by an antenna 652 and provided to a receiver unit (RCVR) 654. Receiver unit 654 processes and digitizes the received signal to provide samples. A received (RX) data processor 656 then demodulates and decodes the samples to provide decoded data, which may include recovered traffic data, messages, signaling, and so on. The traffic data may be provided to a data sink 658, and the carrier assignment may provide the parameters for multiple modulation schemes (e.g. segments to modulate using orthogonal scheme) should be executed, and Power Control (PC) commands sent for the terminal are provided to a controller 660.

Controller 660 directs data transmission on the uplink using the specific carriers that have been assigned to the AT 110x and indicated in the received carrier assignment. Controller 660 further adjusts the modulation scheme used for specified segments for the uplink (e.g. reverse link) transmissions based on the received modulation information.

For each active terminal 120, a TX data processor 674 receives traffic data from a data source 672 and signaling and other information from controller 660. For example, controller 660 may provide information indicative of the required transmit power, the maximum transmit power, or the difference between the maximum and required transmit powers for the terminal. The various types of data are coded and modulated by TX data processor 674. According to an embodiment, the TX data processor 674 may determine the modulation scheme selected from one or more modulation schemes to modulate signals on specified segments or assigned carriers. Using a transmitter unit 676 signal is further processed to generate an uplink modulated signal that is then transmitted from antenna 652.

At access point 110x, the transmitted and modulated signals from the terminals are received by antenna 618, processed by a receiver unit 632, and demodulated and decoded by an RX data processor 634. The processed data is then provided to Data Sink 636 for further processing. Receiver unit 632 may use the multiple modulation schemes to extract data and determine the transmitter of the data.

The techniques described herein may be implemented by various means. For example, these techniques may be implemented in hardware, software, or a combination thereof. For a hardware implementation, the processing units used to perform erasure detection and/or power control may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. Software codes may be stored in a memory unit (e.g., memory unit 622 or 662 in FIG. 6) and executed by a processor (e.g., controller 620 or 660). The memory unit may be implemented within the processor or external to the processor, in which case it can be communicatively coupled to the processor via various means as is known in the art.

The previous description of the disclosed embodiments is provided to enable any person skilled in the art to make and use the multiple modulation techniques. Various modifications to these embodiments will be readily apparent to those skilled in the art, and the generic principles defined herein may be applied to other embodiments. Thus, the description is not intended to be limited to the aspects shown herein but is to be accorded the widest scope consistent with the principles and novel features disclosed herein.

What is claimed is:

1. A method of wireless communication, comprising:
   modulating at least one subcarrier in a first frequency region of a time interval using a first modulation scheme when information of a first type is scheduled for transmission in the first frequency region, wherein the first frequency region covers a configurable portion of system bandwidth; and
   modulating one or more subcarriers in a second frequency region of the time interval using a second modulation scheme when information of a second type is scheduled for transmission in the second frequency region, wherein the first and second frequency regions correspond to different parts of the system bandwidth, wherein the second modulation scheme is different from said first modulation scheme, and wherein one modulation scheme is used for each subcarrier utilized for communication in the time interval.

2. The method as claimed in claim 1, further comprising receiving an indication to apply said first modulation scheme to modulate the at least one subcarrier in the first frequency region.

3. The method as claimed in claim 1, wherein said modulating the at least one subcarrier using said first modulation scheme comprises using a non-orthogonal multiple access scheme.

4. The method as claimed in claim 3, wherein said using said non-orthogonal multiple access scheme comprises using a CDMA scheme.

5. The method as claimed in claim 1, wherein said modulating said one or more subcarriers in the second frequency region using said second modulation scheme comprises using an orthogonal multiple access scheme.

6. The method as claimed in claim 5, wherein said using said orthogonal multiple access scheme comprises using an OFDMA scheme.

7. The method as claimed in claim 1, wherein said modulating said one or more subcarriers in the second frequency region using said second modulation scheme comprises using an orthogonal multiple access scheme or a non-orthogonal multiple access scheme.

8. The method as claimed in claim 1, further comprising modulating at least one subcarrier used for communicating a channel quality indicator.

9. The method as claimed in claim 1, further comprising modulating at least one subcarrier used for communicating a pilot.

10. A method of wireless communication, comprising:
    demodulating at least one subcarrier in a first frequency region of a time interval using a first demodulation scheme, wherein the first frequency region covers a configurable portion of system bandwidth; and
    demodulating one or more subcarriers in a second frequency region of the time interval using a second demodulation scheme, different from the first demodulation scheme, wherein the first and second frequency regions correspond to different parts of the system bandwidth, and wherein one demodulation scheme is used for each subcarrier utilized for communication in the time interval.

11. The method as claimed in claim 10, further comprising determining if a request to apply said first demodulation scheme is received.

12. The method as claimed in claim 10, wherein said demodulating said at least one subcarrier using said first demodulation scheme comprises using a non-orthogonal multiple access scheme.

13. The method as claimed in claim 12, wherein said using said non-orthogonal multiple access scheme comprises using a CDMA scheme.

14. The method as claimed in claim 10, further comprising receiving said at least one subcarrier modulated using a non-orthogonal multiple access scheme.

15. The method as claimed in claim 10, wherein said demodulating said one or more subcarriers in the second frequency region using said second demodulation scheme comprises using an orthogonal multiple access scheme.

16. The method as claimed in claim 15, wherein said using said orthogonal multiple access scheme comprises using an OFDMA scheme.

17. The method as claimed in claim 10, further comprising receiving said one or more subcarriers modulated using an orthogonal multiple access scheme.

18. The method as claimed in claim 10, wherein said demodulating said one or more subcarriers in the second frequency region using said second demodulation scheme comprises using an orthogonal multiple access scheme or a non-orthogonal multiple access scheme.

19. The method as claimed in claim 10, further comprising demodulating at least one subcarrier used for communicating a channel quality indicator.

20. The method as claimed in claim 10, further comprising demodulating at least one subcarrier used for communicating a pilot.

21. The method as claimed in claim 10, further comprising receiving an indication to start executing a soft handoff task.

22. The method as claimed in claim 10, further comprising sending a request to start using a first modulation scheme to modulate the at least one subcarrier in the first frequency region.

23. An apparatus for wireless communication, comprising:
    means for modulating at least one subcarrier in a first frequency region of a time interval using a first modulation scheme when information of a first type is scheduled for transmission in the first frequency region, wherein the first frequency region covers a configurable portion of system bandwidth; and means for modulating one or more subcarriers in a second frequency region of the time interval using a second modulation scheme when information of a second type is scheduled for transmission in the second frequency region, wherein the first and second frequency regions correspond to different parts of the system bandwidth, wherein the second modulation scheme is different from said first modulation scheme, and wherein one modulation scheme is used for each subcarrier utilized for communication in the time interval.

24. The apparatus as claimed in claim 23, further comprising
means for receiving an indication to apply said first modulation scheme to modulate the at least one subcarrier in the first frequency region.

25. The apparatus as claimed in claim 23, wherein said means for modulating said at least one subcarrier using said first modulation scheme comprises means for using a non-orthogonal multiple access scheme.

26. The apparatus as claimed in claim 25, wherein said means for using said non-orthogonal multiple access scheme comprises means for using a CDMA scheme.

27. The apparatus as claimed in claim 23, wherein said means for modulating said one or more subcarriers in the second frequency region using said second modulation scheme comprises means for using an orthogonal multiple access scheme.

28. The apparatus as claimed in claim 27, wherein said means for using said orthogonal multiple access scheme comprises means for using an OFDMA scheme.

29. The apparatus as claimed in claim 23, wherein said means for modulating said one or more subcarriers in the second frequency region using said second modulation scheme comprises means for using an orthogonal multiple access scheme or a non-orthogonal multiple access scheme.

30. The apparatus as claimed in claim 23, further comprising
means for modulating at least one subcarrier used for communicating a channel quality indicator.

31. The apparatus as claimed in claim 23, further comprising
means for modulating at least one subcarrier used for communicating a pilot.

32. An apparatus for wireless communication, comprising:
means for demodulating at least one subcarrier in a first frequency region of a time interval using a first demodulation scheme, wherein the first frequency region covers a configurable portion of system bandwidth; and
means for demodulating one or more subcarriers in a second frequency region of the time interval using a second demodulation scheme, different from said first demodulation scheme, wherein the first and second frequency regions correspond to different parts of the system bandwidth, and wherein one demodulation scheme is used for each subcarrier utilized for communication in the time interval.

33. The apparatus as claimed in claim 32, further comprising
means for determining if a request to apply said first demodulation scheme was received.

34. The apparatus as claimed in claim 32, wherein said means for demodulating said at least one subcarrier using said first demodulation scheme comprises means for using a non-orthogonal multiple access scheme.

35. The apparatus as claimed in claim 34, wherein said means for using said non-orthogonal multiple access scheme comprises means for using a CDMA scheme.

36. The apparatus as claimed in claim 32, further comprising
means for receiving said at least one subcarrier modulated using a non-orthogonal multiple access scheme.

37. The apparatus as claimed in claim 32, wherein said means for demodulating said one or more subcarriers in the second frequency region using said second demodulation scheme comprises means for using an orthogonal multiple access scheme.

38. The apparatus as claimed in claim 37, wherein said means for using the orthogonal multiple access scheme comprises means for using an OFDMA scheme.

39. The apparatus as claimed in claim 32, further comprising
means for receiving said one or more subcarriers modulated using an orthogonal multiple access scheme.

40. The apparatus as claimed in claim 32, wherein said means for demodulating said one or more subcarriers in the second frequency region using said second demodulation scheme comprises means for using an orthogonal multiple access scheme or a non-orthogonal multiple access scheme.

41. The apparatus as claimed in claim 32, further comprising
means for demodulating at least one subcarrier used for communicating a channel quality indicator.

42. The apparatus as claimed in claim 32, further comprising
means for demodulating at least one subcarrier used for communicating a pilot.

43. The apparatus as claimed in claim 32, further comprising
means for receiving an indication to start executing a soft handoff task.

44. The apparatus as claimed in claim 32, further comprising
means for sending a request to start using a first modulation scheme to modulate the at least one subcarrier in the first frequency region.

45. A non-transitory processor-readable medium comprising instructions which, when executed by a processor, cause the processor to perform operations including:
demodulating at least one subcarrier in a first frequency region of a time interval using a first demodulation scheme, wherein the first frequency region covers a configurable portion of system bandwidth; and
demodulating one or more subcarriers in a second frequency region of the time interval using a second demodulation scheme, different from said first demodulation scheme, wherein the first and second frequency regions correspond to different parts of the system bandwidth, and wherein one demodulation scheme is used for each subcarrier utilized for communication in the time interval.

46. The non-transitory processor-readable medium of claim 45, further comprising instructions to cause determining if a request to apply said first demodulation scheme is received.

47. The non-transitory processor-readable medium of claim 45, wherein said demodulating said at least one subcarrier in the first frequency region using said first demodulation scheme comprises using a non-orthogonal multiple access scheme.

48. The non-transitory processor-readable medium of claim 45, wherein said demodulating said one or more subcarriers in the second frequency region using said second demodulation scheme comprises using an orthogonal multiple access scheme.

49. A non-transitory processor-readable medium comprising instructions which, when executed by a processor, cause the processor to perform operations including:
  modulating at least one subcarrier in a first frequency region of a time interval using a first modulation scheme when information of a first type is scheduled for transmission in the first frequency region, wherein the first frequency region covers a configurable portion of system bandwidth; and
  modulating one or more subcarriers in a second frequency region of the time interval using a second modulation scheme when information of a second type is scheduled for transmission in the second frequency region, wherein the first and second frequency regions correspond to different parts of the system bandwidth, wherein the second modulation scheme is different from said first modulation scheme, and wherein one modulation scheme is used for each subcarrier utilized for communication in the time interval.

50. The non-transitory processor-readable medium of claim 49, further comprising instructions to cause receiving an indication to apply said first modulation scheme to modulate the at least one subcarrier in the first frequency region.

51. The non-transitory processor-readable medium of claim 49, wherein said modulating said at least one subcarrier in the first frequency region using said first modulation scheme comprises using a non-orthogonal multiple access scheme.

52. The non-transitory processor-readable medium of claim 49, wherein said modulating said one or more subcarriers in the second frequency region using the second modulation scheme comprises using an orthogonal multiple access scheme.

53. In a wireless communication system, an apparatus comprising:
  an electronic device configured to demodulate at least one subcarrier in a first frequency region of a time interval using a first demodulation scheme, and to demodulate one or more subcarriers in a second frequency region of the time interval using a second demodulation scheme, different from said first demodulation scheme, wherein the first frequency region covers a configurable portion of system bandwidth, wherein the first and second frequency regions correspond to different parts of the system bandwidth, and wherein one demodulation scheme is used for each subcarrier utilized for communication in the time interval.

54. The apparatus of claim 53, wherein said first demodulation scheme comprises a non-orthogonal multiple access scheme.

55. The apparatus of claim 53, wherein said second demodulation scheme comprises an orthogonal multiple access scheme.

56. In a wireless communication system, an apparatus comprising:
  an electronic device configured to modulate at least one subcarrier in a first frequency region of a time interval using a first modulation scheme when information of a first type is scheduled for transmission in the first frequency region, and to modulate one or more subcarriers in a second frequency region of the time interval using a second modulation scheme when information of a second type is scheduled for transmission in the second frequency region, wherein the first frequency region covers a configurable portion of system bandwidth, wherein the first and second frequency regions correspond to different parts of the system bandwidth, wherein the second modulation scheme is different from said first modulation scheme, and wherein one modulation scheme is used for each subcarrier utilized for communication in the time interval.

57. The apparatus of claim 56, wherein said first modulation scheme comprises a non-orthogonal multiple access scheme.

58. The apparatus of claim 56, wherein said second modulation scheme comprises an orthogonal multiple access scheme.

59. The method as claimed in claim 1, wherein the first frequency region comprises at least one control channel and the second frequency region comprises at least one data channel.

60. The method as claimed in claim 1, wherein the time interval has a configurable duration.

61. The method as claimed in claim 1, wherein the first frequency region comprises a configurable number of subcarriers.

62. The method as claimed in claim 1, further comprising sending modulated subcarriers on uplink from a terminal to a base station.

63. The method as claimed in claim 1, further comprising modulating at least one other subcarrier in a second time interval using the second modulation scheme.

64. The method as claimed in claim 1, further comprising modulating at least one other subcarrier in a second time interval using the first modulation scheme.

65. The method as claimed in claim 1, further comprising sending at least two control channels on at least two sets of subcarriers in the first frequency region, each control channel being sent on a different set of subcarriers.

66. The method as claimed in claim 10, wherein the first frequency region comprises at least one control channel and the second frequency region comprises at least one data channel.

67. The method as claimed in claim 10, wherein the time interval has a configurable duration.

68. The method as claimed in claim 10, wherein the first frequency region comprises a configurable number of subcarriers.

69. The method as claimed in claim 10, further comprising receiving the modulated subcarriers on uplink from at least one terminal at a base station.

70. The method as claimed in claim 10, further comprising demodulating at least one other subcarrier in a second time interval using the second demodulation scheme.

71. The method as claimed in claim 10, further comprising demodulating at least one other subcarrier in a second time interval using the first demodulation scheme.

72. The method as claimed in claim 10, further comprising receiving at least two control channels on at least two sets of subcarriers in the first frequency region, each control channel being received on a different set of subcarriers.

* * * * *